Patented Nov. 26, 1940

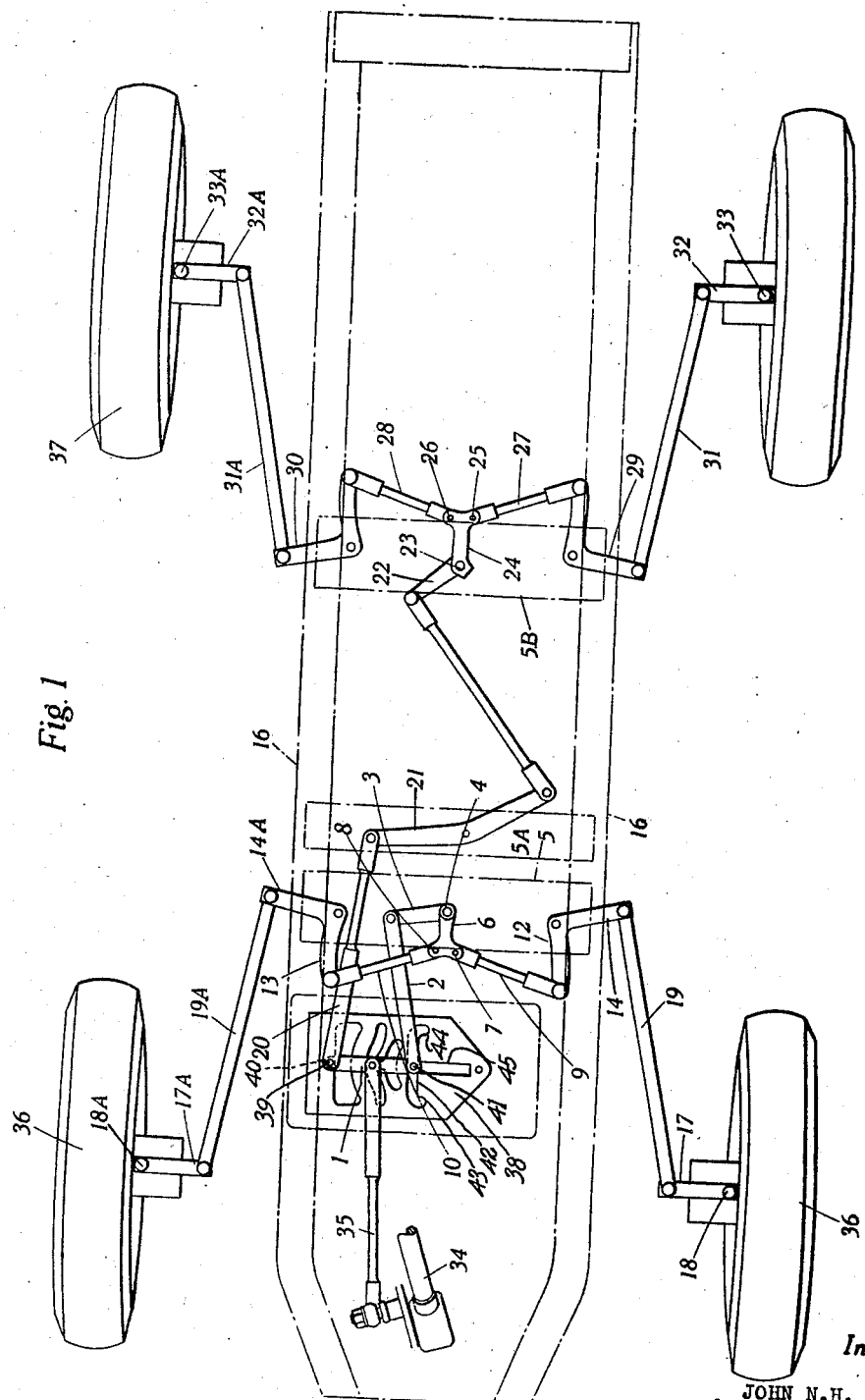

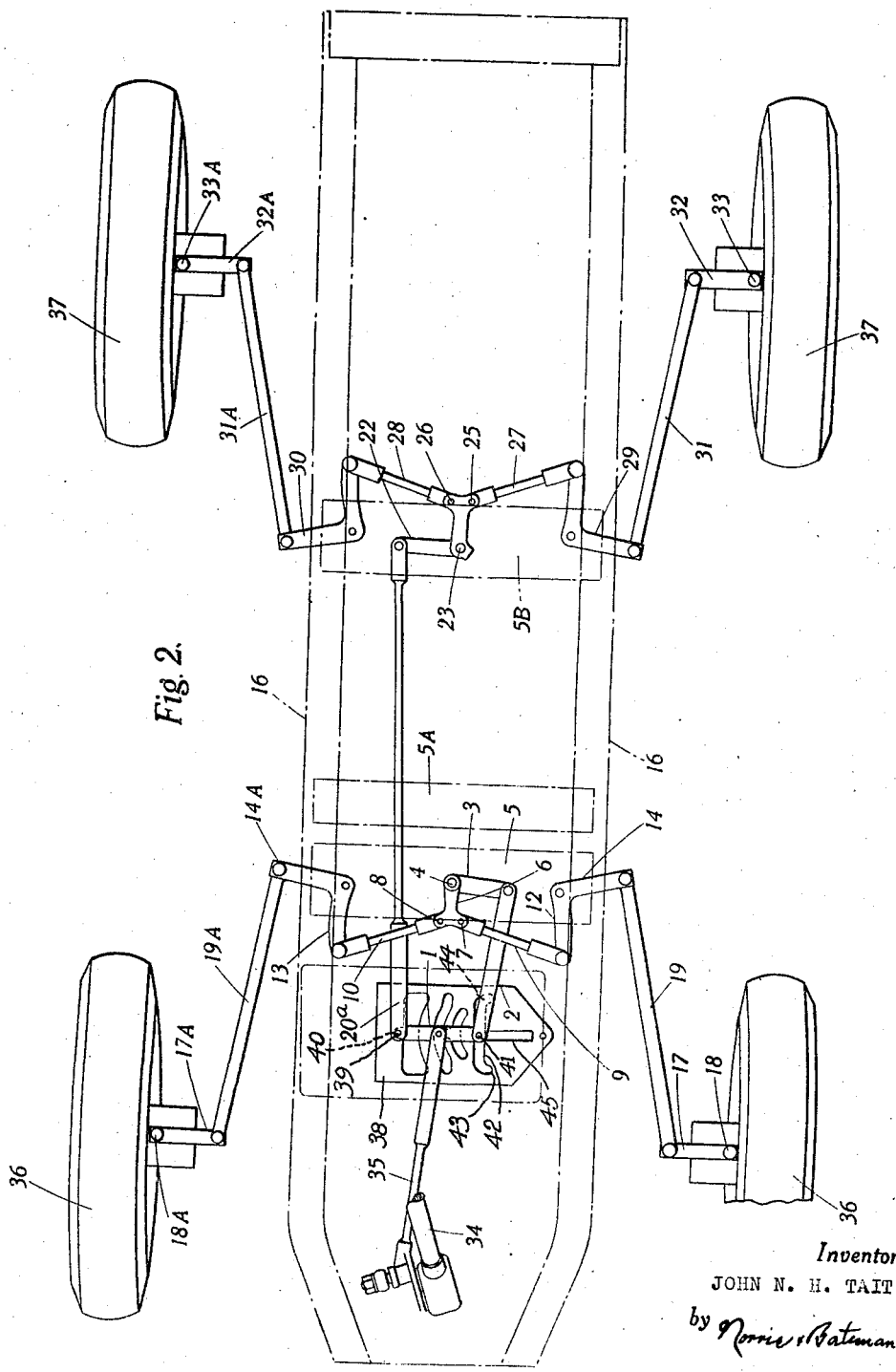

2,223,274

UNITED STATES PATENT OFFICE 2,223,274

STEERING MECHANISM FOR MOTOR VEHICLES

John Noel Hutton Tait, Coventry, England, assignor to The Birmingham Small Arms Company Limited, Birmingham, England, a British company Application October 18, 1939, Serial No. 300,078
In Great Britain October 17, 1938

10 Claims. (Cl. 280—91)

This invention relates to steering mechanism for motor vehicles of the kind wherein both the front and the rear wheels are adapted to be driven and steered, and is particularly suitable for use with a steering mechanism such as is described and claimed in application Serial No. 313,484, filed January 12, 1940, in which progressive steering of the front and rear wheels is effected by means of a grooved master or guide plate operating in conjunction with a laterally displaceable rocking lever, the ends of which are respectively connected by lever and link mechanism to the front and the rear steering wheels.

The object of the present invention is to provide an improved construction and arrangement of lever and link mechanism adapted to provide a maximum ground clearance, a minimum friction loss in operation, a minimum toe-in variation with road wheel vertical movement when steering in straight direction, and also to steer the wheels with suitable "Ackerman" effect.

According to the invention there is provided a steering mechanism for motor vehicles of the kind referred to wherein one end of the rocking lever controlled by the steering gear is adapted by means of suitably disposed linkages to rotate a lever to which are pivotally connected two oppositely disposed sets of linkages associated respectively with the two front wheels in such a way that rotation of the said lever by movement of the rocking lever effects steering of the front wheels.

According to the preferred arrangement the other end of the rocking lever is adapted by means of suitably disposed linkages to rotate a further lever to which are pivotally connected two oppositely disposed sets of linkages associated respectively with the two rear wheels in such a way that rotation of the said further lever by movement of the rocking lever effects steering of the rear wheels.

These and other features of the invention will be more completely understood from the following detailed description which is given in conjunction with the accompanying drawings, in which—

Figure 1 is a plan view in skeleton form of a motor vehicle embodying a steering mechanism constructed in accordance with the invention, only those parts of the vehicle being shown which are essential for a complete understanding of the invention, while Figure 2 is also a plan view in skeleton form of a motor vehicle embodying the invention and illustrates a modification of the arrangement shown in Figure 1.

Referring now to Figure 1 of these drawings, the side arms 16 of the chassis of the vehicle are shown in dotted lines, these side arms being provided with three transverse frame members 5, 5a and 5b which are adapted to support the various shafts of the linkage mechanisms to be described.

The steering gear 34 is pivotally connected by means of a link 35 to the centre part of an endwise displaceable rocking lever 1, this rocking lever being mounted in a fixed guide plate 38 of the kind described in the aforesaid application. One end of this rocking lever 1 is connected by means of a link 2 to a laterally disposed horizontal lever 3 keyed on to a vertically disposed shaft 4 mounted in suitable bearings carried on the chassis frame 5, and to the said vertical shaft 4 is keyed a lever 6 carrying two laterally disposed pivot pins 7 and 8 which are respectively connected by links 9 and 10 to one arm of bell crank levers 12 and 13 mounted or pivoted on the chassis frame 5 towards the near and off sides thereof, the other arms 14 and 14a of said bell crank levers 12 and 13 being arranged to pass through longitudinal slots formed in the side members 16 of the chassis frame in order to provide good ground clearance, and to the said outwardly projecting arms 14 and 14a of said bell crank levers 12 and 13 are connected laterally disposed levers 17 and 17a keyed to the wheel swivels 18 and 18a of the front wheels 36 by means of links 19 and 19a which are substantially horizontal when the chassis frame of the vehicle is at a normal height above level ground.

The aforesaid levers and links are so disposed and arranged as to provide the desired "Ackerman" effect, that is to say, in turning a corner, the inner wheel is turned through a greater angle than the outer wheel.

The mechanism for steering the rear wheels comprises a link 20 connecting the other or opposite end of the aforesaid rocking lever to a centrally pivoted bell crank lever 21 disposed in a horizontal plane, the other end of said bell crank lever 21 being linked to a lever 22 keyed to a centrally disposed vertical shaft 23, and to the latter is keyed a lever 24 carrying two laterally disposed pivot pins 25 and 26 which are respectively connected by links 27, 28, levers 29, 30, links 31, 31A, levers 32, 32A to the swivels 33, 33A of the rear wheels 37 to effect steering of same in a manner similar to that already described for effecting the steering of the front wheels.

The operation of the rocking lever 1, which is described in detail in the aforesaid application, may be briefly described for the purposes of the present invention as follows: Assuming the parts to be as shown in Fig. 1, operation of the steering gear 34 to steer the vehicle to the right or left will reciprocate the link 35 and thereby rock the lever 1 about the pivot pin 39 to which the link 20 is connected, and which normally engages in a recess 40 in the guide plate as a fulcrum, thereby reciprocating the link 2 which, in turn, rocks the levers 3 and 6 and, through the linkages 9 and 19 and 10 and 19A and bell cranks 12 and 13, steer the front wheels 36 through the levers 17 and 17A fixed to the swivels of these wheels. During this operation, the pivot pin 41 on the end of the rocking lever 1 to which the link 2 is attached swings in a slot 42 in the guide plate, and if it moves sufficiently far will engage in one or the other of the notches 43 and 44 at the ends of this slot, thereby locking the front wheels from further steering movement, and the resultant endwise movement of the rocking lever 1 withdrawing the pivot pin 39 from the notch 40 in the guide plate and thereby unlocking the rocking lever to effect steering by the rear wheels. Further operation of the steering gear in the same direction as before will cause the lever 1 to rock about the pivot pin 41 as a center, thereby reciprocating the link 20 and, through the levers 21, 22 and 24, linkages 27, 28, 31 and 31A, bell cranks 29 and 30 and levers 32 and 32A fixed to the swivels of the rear wheels 37, will effect steering of the rear wheels to further steer the vehicle in the same direction in which the front wheels are steering it. By moving the rocking lever 1 endwise from the position shown in Fig. 1 so that its pivot pin 39 is withdrawn from the recess 40 in the guide plate and its pivot pin 41 enters a slot 45 therein, the front wheels are locked from steering movement and the vehicle may then be steered by the rear wheels only.

In Figure 2, a similar form of steering mechanism is shown except that in the arrangement for steering the rear wheels the centrally pivoted bell crank lever 21, as used in the arrangement of Figure 1 is omitted, a link 20a which is pivoted to the end of the rocking lever 1, being directly pivoted to the end of the lever 22 which is keyed to the vertical shaft 23, so that this shaft is directly rotated by movement of the link 20a. All other parts of the steering mechanism are identical with those already described in conjunction with Figure 1.

It is to be understood however that the invention is not to be regarded as limited to the particular details of construction described and illustrated, for example, in a modified form of construction, the levers 3 and 6, and the levers 22 and 24 instead of being separately keyed to the shafts 4 and 23, might be formed as bell-crank levers mounted on the shafts 4 and 23 respectively. This modified form of construction could be equally well applied to either of the arrangements shown in Figures 1 and 2 of the drawings.

In the application of steering mechanism constructed in accordance with this invention, for use in conjunction with independent wheel suspension of the kind comprising laterally disposed upper and lower spring supported links, it is found necessary, in order to provide a clearance for the levers keyed to the lower end of the wheel swivels, and at the same time to provide maximum ground clearance, to arch in an upward direction the lower of the aforesaid links.

Having thus described my invention, what I claim as new and desire to secure by Letters Patent is:

1. Steering mechanism for motor vehicles of the type steered at least by its front wheels, comprising a steering gear, an endwise displaceable rocking lever having means pivotally connecting it between its ends to the steering gear for reciprocation thereby, two oppositely disposed linkages associated respectively with the two front wheels of the vehicle, means including a second lever connecting said linkages to one end of said rocking lever and a guide plate engageable, by endwise displacement of said rocking lever, with the other end of said rocking lever as a fulcrum about which said rocking lever, when reciprocated, is rockable as a center, said second lever being rotatable by reciprocation of said rocking lever to effect steering of the front wheels.

2. Steering mechanism for motor vehicles of the type steered at least by two of its wheels at one end, comprising a steering gear, a rocking lever having means connecting it to said steering gear to be controlled thereby, two oppositely disposed linkages associated respectively with said two wheels of the vehicle, means including a second lever connecting said linkages to one end of said rocking lever, said second lever being rotatable by movement of said rocking lever and carrying a pair of pivot pins, and said linkages comprising a pair of bell crank levers to one arm of each of which is linked the respective pivot pin, and a pair of levers linked respectively to the other arms of said bell crank levers and fixed to the wheel swivels of said two wheels of the vehicle to effect steering thereof.

3. Steering mechanism for motor vehicles of the type steered at least by two of its wheels at one end, comprising a steering gear, a rocking lever having means connecting it to said steering gear to be controlled thereby, two oppositely disposed linkages associated respectively with said two wheels of the vehicle, means including a second lever connecting said linkages to one end of said rocking lever, said second lever being rotatable by movement of said rocking lever and carrying a pair of pivot pins, and said linkages comprising a pair of bell crank levers to one arm of each of which is linked the respective pivot pin, and a pair of levers linked respectively to the other arms of said bell crank levers and fixed to the wheel swivels of said two wheels of the vehicle to effect steering thereof, said bell crank levers being arranged to pass through longitudinal slots formed in the chassis frame of the vehicle.

4. Steering mechanism for motor vehicles of the type steered by its front and rear wheels, comprising a steering gear, an endwise displaceable rocking lever means pivotally connecting said lever between its ends to the steering gear for reciprocation thereby, two oppositely disposed linkages associated respectively with the two front wheels of the vehicle, means including a second lever connecting said linkages to one end of said rocking lever, a guide plate engageable, by endwise displacement of said rocking lever, with one or the other end of said rocking lever as a fulcrum about which said rocking lever, when reciprocated, is rockable as a center, said second lever being rotatable by reciprocation of said rocking lever to effect steering of the front wheels, a further lever, means connecting said further lever to the other end of said rocking lever, and two oppositely disposed linkages connected to said further lever and associated respectively with the two rear wheels of the motor vehicle, said further lever being rotatable by reciprocation of said rocking lever to effect steering of the rear wheels.

5. Steering mechanism according to claim 4, wherein said further lever carries a pair of pivot pins which are linked respectively to one arm of a pair of bell crank levers the other arms of which are linked respectively to a pair of levers fixed to the wheel swivels of the two rear wheels of the vehicle.

6. Steering mechanism according to claim 4, wherein said further lever carries a pair of pivot pins which are linked respectively to one arm of a pair of bell crank levers the other arms of which are linked respectively to a pair of levers fixed to the wheel swivels of the two rear wheels of the vehicle, said bell crank levers being arranged to pass through longitudinal slots formed in the chassis frame of the vehicle.

7. Steering mechanism according to claim 4, wherein said further lever is fixed to a shaft, and said means connecting said further lever to said rocking lever includes an actuating lever one end of which is fixed to said shaft and the other end of which is pivotally connected to said rocking lever by a linkage comprising a link pivotally interconnected between said other end of said rocking lever and said other end of said actuating lever.

8. Steering mechanism according to claim 4, wherein said further lever comprises an arm of a bell crank lever, said arm being pivotally connected to said oppositely disposed linkages associated with the two rear wheels of the vehicle, and said means connecting said further lever to said rocking lever includes the other arm of said bell crank lever which is pivotally connected to the said rocking lever by a linkage comprising a link pivotally interconnected between said other end of said rocking lever and said other arm of said bell crank lever.

9. Steering mechanism according to claim 4, wherein said further lever is fixed to a shaft, and said means connecting said further lever to said rocking lever includes an actuating lever one end of which is fixed to said shaft, the other end of said actuating lever being pivotally connected to the end of said rocking lever by a linkage comprising a link connected to one end of a bell crank lever the other end of which is pivotally connected by a further link to the end of said actuating lever.

10. Steering mechanism according to claim 4, wherein said further lever comprises an arm of a bell crank lever, said arm being pivotally connected to said oppositely disposed linkages associated with the two rear wheels of the vehicle, and said means connecting said further lever to said rocking lever includes the other arm of said bell crank lever which is pivotally connected to said other end of said rocking lever by a link pivotally connected to one end of a lever the other end of which is pivotally connected by a further link to the end of said rocking lever.

JOHN NOEL HUTTON TAIT.